Feb. 13, 1962     W. P. CROPPER ETAL     3,020,749
TIMER-COMPUTER
Filed Dec. 31, 1958     5 Sheets-Sheet 2
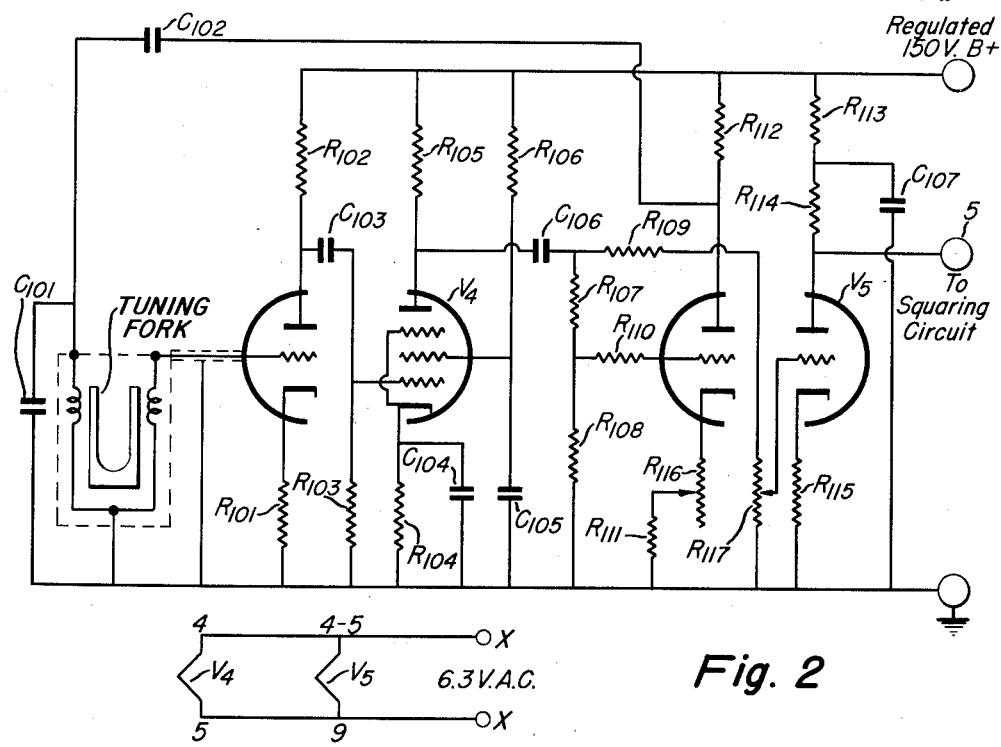
*Fig. 2*
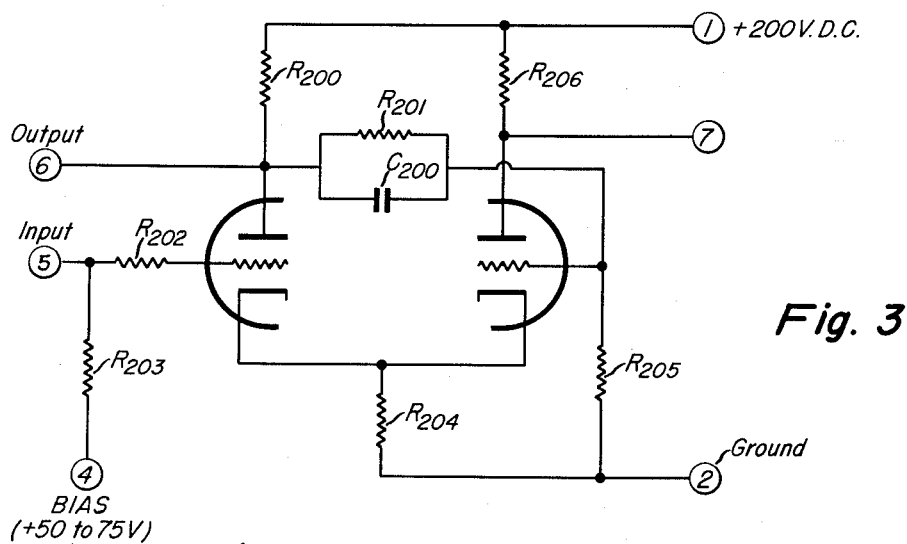
*Fig. 3*
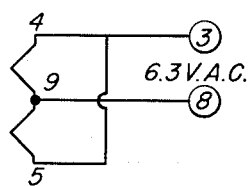
INVENTORS:
Wendell P. Cropper
Bruce A. Ritzenthaler
BY
*Gerald Rose*
ATTORNEY Feb. 13, 1962 W. P. CROPPER ET AL 3,020,749
TIMER-COMPUTER
Filed Dec. 31, 1958 5 Sheets-Sheet 3

INVENTORS:
Wendell P. Cropper
Bruce A. Ritzenthaler
BY
*Gerald Rose*
ATTORNEY

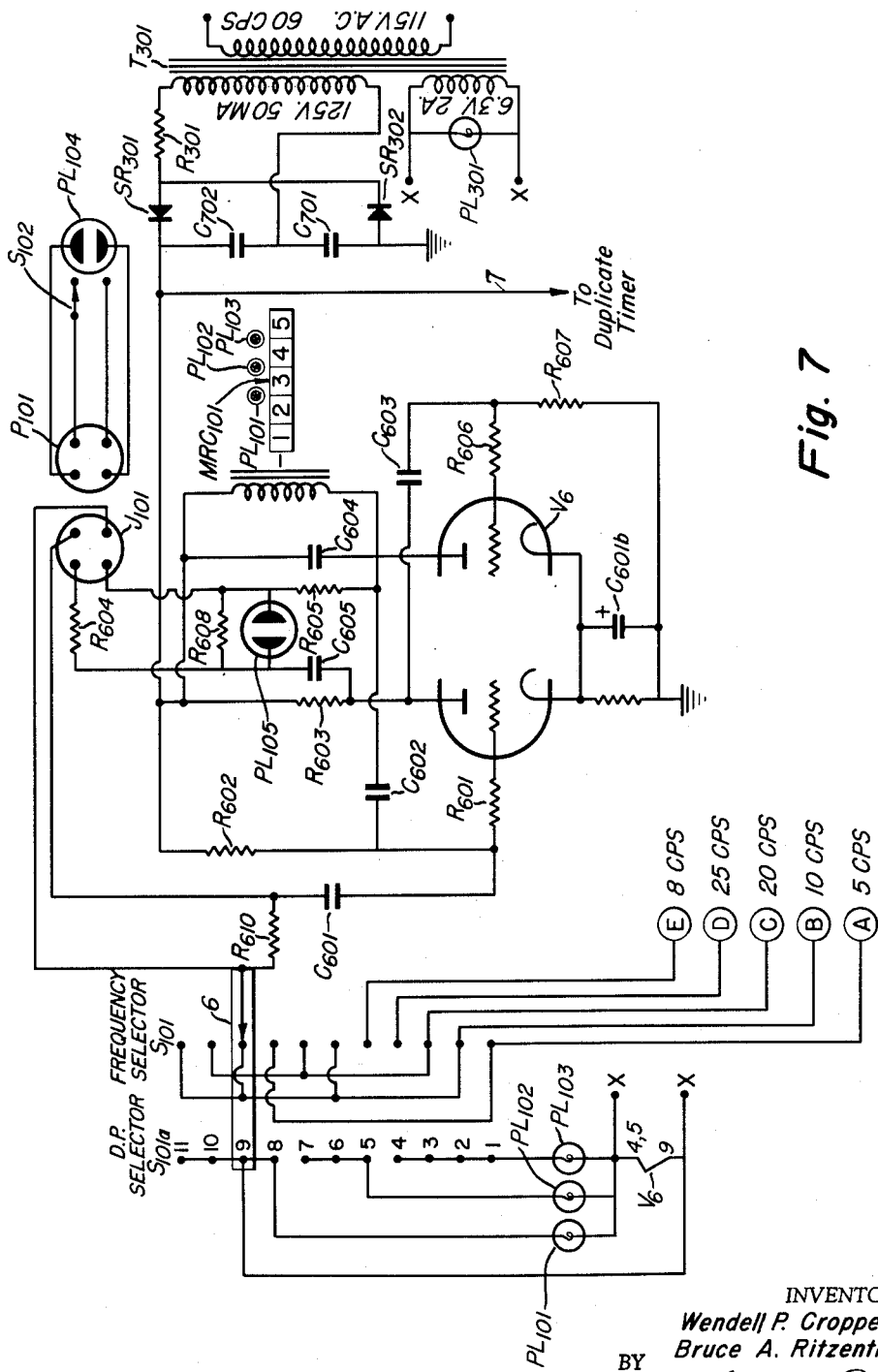

United States Patent Office 3,020,749
Patented Feb. 13, 1962

3,020,749
TIMER-COMPUTER
Wendell P. Cropper, Lansing, and Bruce Allen Ritzenthaler, Chicago, Ill., assignors to Standard Oil Company, Chicago, Ill., a corporation of Indiana
Filed Dec. 31, 1958, Ser. No. 784,233
1 Claim. (Cl. 73—54)

This invention relates to measuring and computing devices, and more particularly relates to a device adapted for measuring time, multiplying the time by one of a plurality of constants, and indicating the desired result directly in units of measurement. The timer-computer of the present invention will be herein described with particular reference to an apparatus for use with viscosimeters to measure and determine the viscosity of liquids.

Viscosimeters of the suspended level or FitzSimons (ASTM Method D–445–53T) type are often used to determine the kinematic viscosity of liquids. In using these viscosimeters, the efflux time, or the time required for a given quantity of oil to flow through a capillary tube is ordinarily measured by means of a stop watch. The kinematic viscosity is then calculated by multiplying the efflux time by a viscosimeter constant which is characteristic for each viscosimeter, and expressing the results in stokes or centistokes. Many laboratories, particularly in petroleum refineries, are required to characterize the viscosities of a wide range of liquids, ranging from light distillates such as gasoline to heavy fuel and road oils, and for this purpose a set of viscosimeters, each suitable for a limited range of viscosities, is employed. By using several viscosimeters, the measurement period is not so long as to require an inordinate time for analysis, yet is not so short that experimental error would account for substantial inaccuracies. Nonetheless, in these determinations viscosity errors frequently do arise by reason of incorrect stop watch readings and from computation and decimal point errors in multiplying efflux time by the viscosimeter constant.

It is therefore a principal object of the present invention to proivde a timer-computer of advanced type wherein the computer indicates a result, such as a viscosity in centistokes, which is obtained by automatic and instantaneous multiplication of an elapsed time interval by one of several available constants. An additional object is to provide such device which expresses results directly in viscosity units, and which automatically indicates the correct decimal place in the answer. A further object is to provide a frequency source unit which generates a plurality of very accurately standardized frequencies. Still another object is to provide an improved counter-indicator unit for selecting a particular frequency and instantaneously integrating the recurring impulses. Yet another object is to provide a frequency source unit which may be used with several counter-indicator units. A particular object is to provide a timer-computer for use with a set of matched viscosimeters, each having a different instrument constant, and which delivers the measured result in terms of centistokes; in particular, the timer-computer is to be suitable for use with liquids having viscosities ranging from about 0.6 to 1200 or more centistokes. Other and more particular objects will become apparent as the description of this invention proceeds.

Briefly, the present invention includes an improved frequency source unit which delivers through alternative connections a plurality of frequencies. These frequencies, which are obtained from a single standard frequency source by an arrangement of several frequency divider units, are chosen so that the several frequencies correspond to the respective viscosimeter constants. The frequency matching a particular viscosimeter is manually selected and fed to a pulse counter-indicator which is connected into the circuit during the viscosimeter efflux period. Thus when a viscosity measurement is to be made, the counter-indicator totals and reports the number of pulsations received during the efflux period. At the same time that the frequency is selected, the appropriate decimal point is also selected and this is indicated on the counter; since decimal point indication is independent of frequency generation, a limited number of frequencies (and hence a relatively small number of frequency divider units) may be used to provide a large number of viscosimeter constants. In the preferred embodiment, where the frequency source unit is separate from the counter mechanism, a single standard frequency source and one set of dividers may be used with several independent and remotely located counters. Thus the present invention provides a simple, extremely accurate apparatus for measuring a time interval and multiplying the elapsed time by any one of a variety of constants. The invention will be more fully understood by reference to the attached drawings in which FIGURE 1 is a schematic block diagram of the timer-computer.

FIGURE 2 is the circuit of a tuning fork oscillator used in delivering accurately timed pulses.

FIGURE 3 is a squaring circuit which converts the sinusoidal output of the tuning fork oscillator to a square wave.

FIGURE 7 is the diagram of a preferred counter unit.

Figure 1:
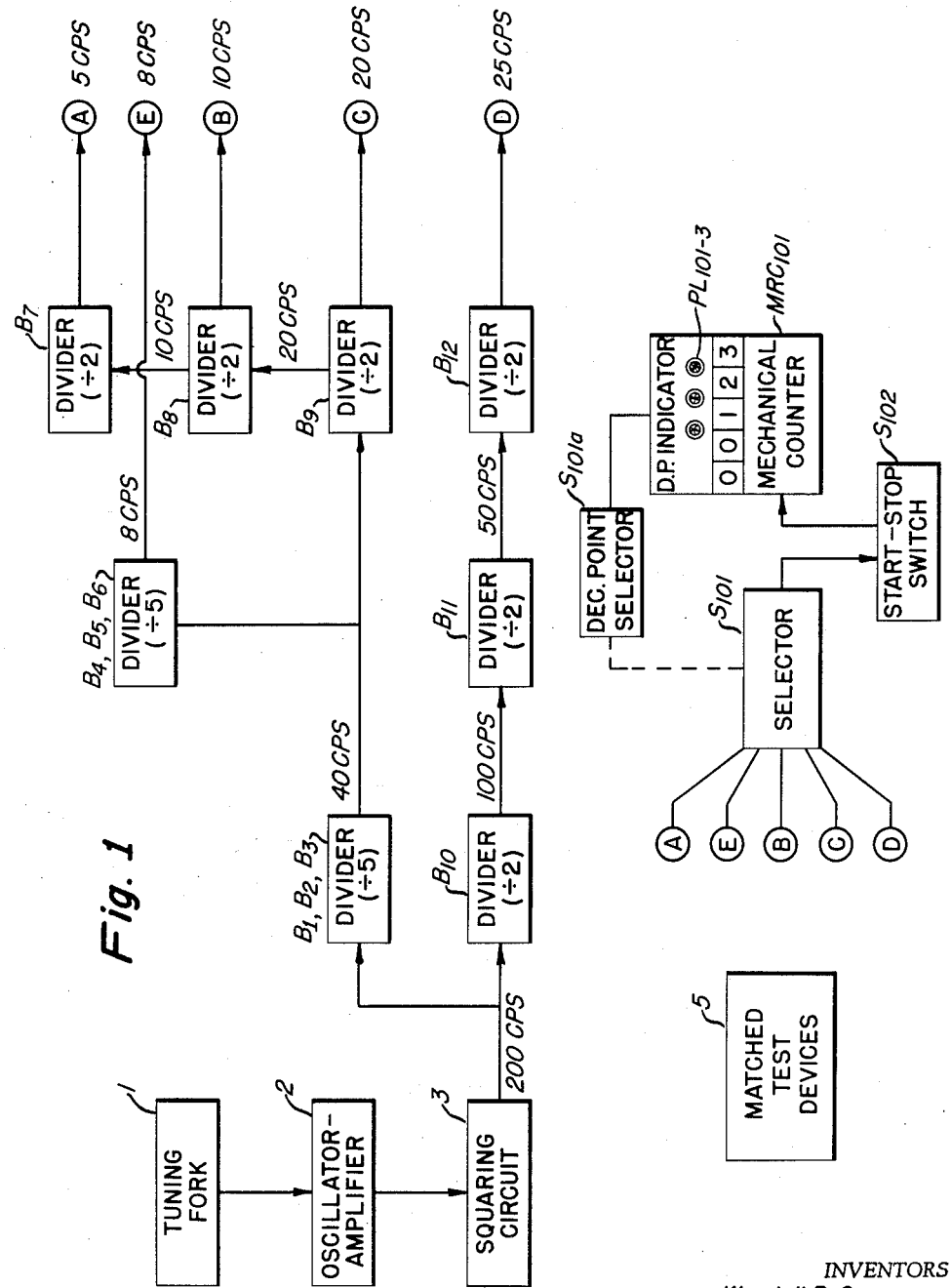

Referring to FIGURE 1, the frequency source unit comprises a tuning fork 1 connected to an oscillator-amplifier 2 which delivers its output to squaring circuit 3, and thence to an arrangement of binary dividers for the purpose of dividing the output of tuning fork into a plurality of frequencies. The output of tuning fork 1, which may be 200 cycles per second, is then split, with one portion being sent to divider B10 where its frequency is divided by two and hence converted to 100 cycle frequency. This in turn passes to divider B11 which again divides the frequency by two to obtain 50 cycle output, and this is sent to divider B12 where further division by two takes place. The resulting 25 cycle output then is transmitted to terminal D. The other take-off from squaring circuit 3 passes to divider B1, B2, B3, where the 200 cycle output is divided by five; a first portion of this output is transmitted to binary divider B9 which divides by two, delivering one part of its 20 cycle output to terminal C. The output of divider B9 is also converted by divider B8 to a 10 cycle per second frequency, which is supplied both to terminal B and to divider B7 where a further division by two again takes place, to provide a 5 cycle output of terminal A. Returning to divider B1, B2, B3, the second portion of its 40 cycle per second output is transmitted to an additional divider stage B4, B5, B6, where division by five is accomplished; the 8 cycle output is transmitted to terminal E. Thus, with the twelve binary dividers arranged as shown, the original 200 cycle per second output of squaring circuit 3 is converted to five accurate frequencies, of five, eight, ten, twenty, and twenty-five cycles per second.

The above frequencies are then transmitted through a five or six wire line to switch S101, which is mounted on one of several similar or identical counter-indicator units situated at various locations throughout an extensive area. In a single location, several matched test devices 5, which may be viscosimeters of the FitzSimons or suspended level type (ASTM D–445–53T, 1955, p.

207), or other similar apparatus such as Ostwald, falling ball, or extrusion type viscosimeters. The appropriate constant corresponding to the particular test device is set on selector switch S101, and at the same time the decimal point is automatically selected by switch S101a which is ganged with S101. The decimal point indication appears on decimal indicator PL101–3 near mechanical counter or integrator MRC101. A start-stop switch S102 is connected in the line between selector S101 and the drive circuit for mechanical counter MRC101; when a viscosity measurement is to be made with, for example, a Fitz-Simons instrument, S102 is turned on when the liquid level passes the first timing mark and turned off when the level passes the second timing mark. The number of pulses generated during the efflux period, corresponding to the time required for the liquid level to fall from the upper to the lower timing marks, is totalled on mechanical counter MRC101 and appears thereon as a number. Since a frequency was selected which is directly proportional to the viscosimeter constant, the number which appears is expressed directly in centistokes, which are units of kinematic viscosity. Correct decimal point indication is provided by selector S101a so that errors hitherto arising from this source are eliminated. Furthermore, decimal point indication as herein employed may be used to permit a limited number of frequencies, say five as in the present apparatus, to furnish several times that number of viscosimeter constants. By the above arrangement, mechanical errors due to inaccurate time measurement, and the computation errors which inevitably occured with prior art measurements are obviated entirely, and viscosity measurements can be made rapidly and with unprecedented accuracy.

FIGURE 2 shows the preferred tuning fork drive circuit, including a vacuum tube oscillator-amplifier stage consisting of V4 and half of V5. The remaining half of V5 functions as the output stage of the oscillator. The precision tuning fork may have a fundamental frequency of 200 cycles per second; commercially available forks are accurate to ±0.003% and are stable to within ±0.006% between 50 and 110° F. Tuning fork 1 is forced to vibrate by current through the drive coil (left coil), which is in the oscillator circuit. Tuning fork drive is adjusted by resistor R116. Effectively, the oscillator is locked to the fundamental frequency of the fork by the pickup coil (right coil) and the fly wheel action of the fork. A highly stable oscillator is provided by this means. The drive circuit of FIGURE 2 is supplied with regulated 150 volts D.C. and with 6.3 volt A.C. at 0.6 amps.; any convenient power supply well known in the art may be employed. The output of the tuning fork drive circuit is approximately 15 volts peak to peak at a frequency of 200 cycles per second. The output is fed to the squaring circuit of FIGURE 3.

The squaring circuit shown in FIGURE 3 is a printed circuit type which is readily available commercially. In this circuit, the output from the tuning fork amplifier is converted to a 100 volt pulse or square wave having approximately one microsecond negative rise time and three microseconds positive rise time at no load. The power supplied to this circuit is 200 volts D.C. at 3.5 ma., and the tube filaments are furnished with 6.3 volt A.C. 0.3 amp. current. The input grid in the squaring circuit tube is biased +50 to +75 volts at terminal 4 which connects to a voltage divider shown hereinafter in FIGURE 6.

Figure 4:
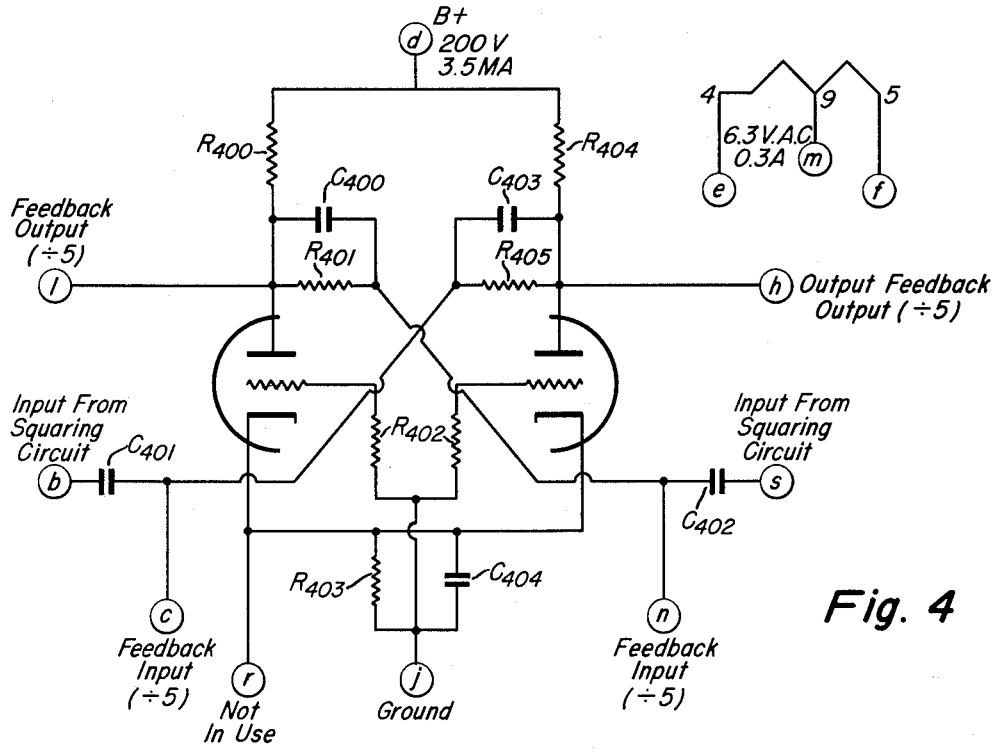
FIGURE 4 is a diagram of an electronic binary divider unit.

The squaring circuit output is then fed to several binary digital dividers, such as the commercial printed circuit module or plug-in shown in FIGURE 4. This divider circuit transmits through terminal "h" an output frequency which is half of the input frequency. This divider is described fully in Eccles and Jordan British Patent 148,582 and is commonly used in radar and digital computers; the Eccles-Jordan circuit is frequently termed a "flip-flop." This circuit has two conditions of equilibrium, that is, either section may be either conducting or cut-off. Input pulses such as those from squared waves generated by tuning fork 1 cause the tube halves to reverse conduction with each half reversing once for each two input pulses. Thus the output of the flip-flop has a frequency of half that of the input, and in the circuit as shown is taken from terminal "h."

Figure 5:
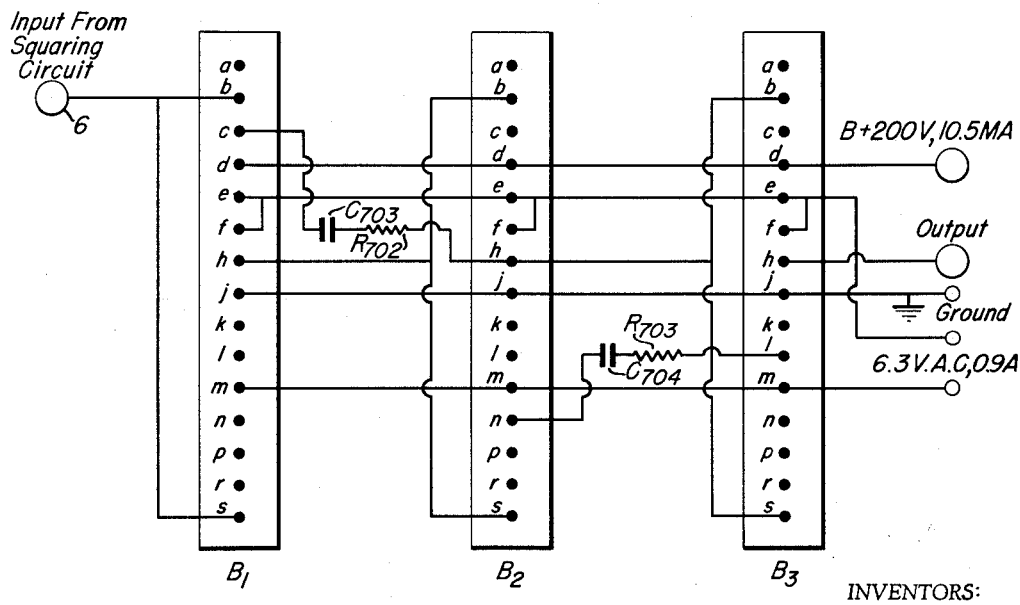
FIGURE 5 shows the arrangement of three binary dividers connected to divide input pulses by five; that is, one output pulse is obtained for five input pulses.

Although the foregoing circuit is capable of dividing only by two, three such circuits may be connected to divide by 5 instead of 8. This is accomplished by feeding back pulses to the input from the proper stage. FIGURE 5 shows three binary stages connected for division by 5. It will be observed that this arrangement is duplicated in the network comprising dividers B4, B5 and B6.

Figure 6:
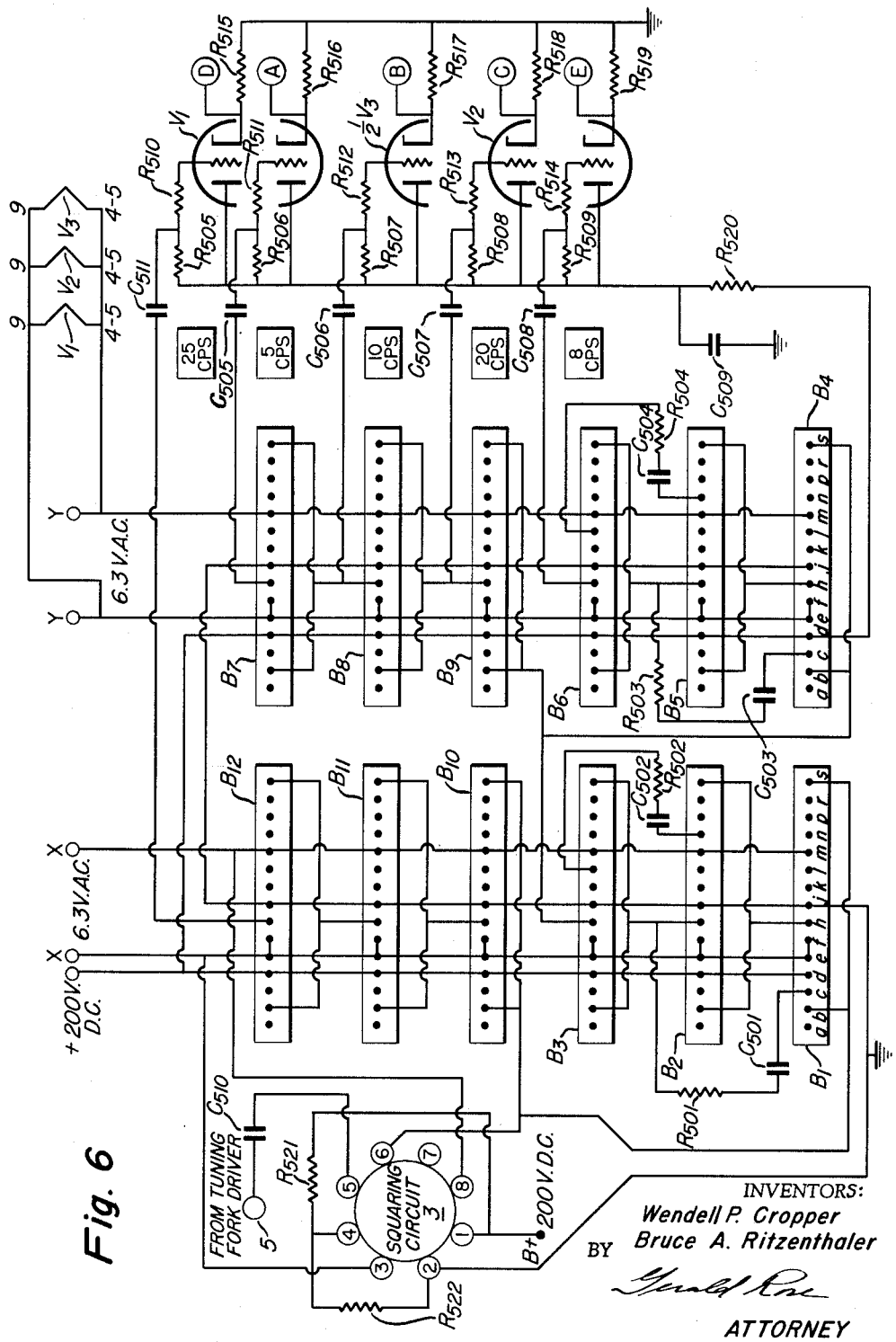
FIGURE 6 is the circuit diagram illustrating connections of the twelve binary stages to the squaring circuit and to the cathode follower output circuit.

FIGURE 6 shows the interconnection of all twelve binary dividers, B1 through B12, as their connectors (Amphenol model 145–015–01) are wired. On the right side of FIGURE 6 five cathode follower stages are shown, each connected to the divided frequency outputs of dividers B7, B6, B8, B9 and B12. These cathode followers, which are single-stage degenerative amplifiers, provide a low output impedance which is useful when the pulses from the various binary dividers are to be sent through long transmission lines whose effective shunt capacitance could cause distortion of the wave forms. Where the binary dividers are located near the counter device, cathode follower stages are unnecessary.

Start-stop switch S102 is here shown as being a manually-actuated switch; this switch may, according to particular needs and preferences, be actuated by any other means. Optical, electrical, capacitive, and radiation-sensitive switches are among the variations known to the art.

It was observed in FIGURE 6 that the output of the several binary dividers constitutes five frequencies, of 5, 8, 10, 20, and 25 cycles per second, delivered respectively to terminals A, E, B, C, and D. These frequencies are transmitted to corresponding terminals in the counter unit shown in FIGURE 7, where they are connected to eleven contact points on frequency selector switch S100. Some terminals, for example terminal B, are connected to more than one contact point, in this case points 2, 6, 9 and 11. Hence moving selector contact 6 may pick off a frequency of 10 cycles per second at any of four locations. However, at point 2 pilot light PL103 will light, while at point 6 light PL102 lights, and at 9 light PL101 is on. These lights are visible near the electro-mechanical counter MRC101 and are positioned so that each light indicates a different decimal point. Thus a limited number of five frequencies is, by means of decimal point selection, extended to permit ten different meter viscosimeter constants to be used. Actually, as many as thirty different meter constants can be made up of five frequencies and three decimal points by providing more positions on selector switch S100. In the specific embodiment shown, the following selector switch positions, meter constants, and decimal point indications are obtained:

| Contact 6 Position | Viscosimeter Constant | Frequency Input | Indicator Lamp |
| --- | --- | --- | --- |
| 1 | 0.005 | 5 | PL103 |
| 2 | 0.01 | 10 | PL103 |
| 3 | 0.02 | 20 | PL103 |
| 4 | 0.025 | 25 | PL103 |
| 5 | 0.08 | 8 | PL102 |
| 6 | 0.10 | 10 | PL102 |
| 7 | 0.20 | 20 | PL102 |
| 8 | 0.5 | 5 | PL101 |
| 9 | 1.0 | 10 | PL101 |
| 10 | 2.0 | 20 | PL101 |
| 11 | Time | 10 | PL101 |

The 11 or "time" position indicates elapsed time in seconds to 0.1 second when the timer-computer is employed as a simple stop watch. It will be observed that this position is identical with switch position 9.

The frequency selected by moving selector contact 6 is transmitted to a counter drive circuit which operates to drive electromechanical counter MRC101. In the line between B6 and tube V6, switch S102 is disposed; this is the manually (or, by similar means) activated switch which starts and stops counter MRC101 during the viscosimeter efflux period. For improved portability of the components, switch 102 is connected into the switch via plug 101 which mates with jack J101. Pilot lights P104 and P105 are neon lights which flicker all during the counting period, the former being conveniently located at or near switch S102 and the latter near counter MRC101.

Counter-indicator MRC101 is shown as a high speed electromechanical 5-digit counter which mechanically sums input pulses from amplifier V6 and indicates its total in the form of a visible set of numbers. Alternatively, other forms of indicators may be employed, such as printouts, "I.B.M." computer cards, etc. As shown in FIGURE 7, the counter circuit is supplied with 115 volt A.C. 60 cycle current which is sent through transformer T301 and thence through a voltage doubler circuit including selenium rectifiers SR301 and SR302 to produce about 300 volts D.C. for the circuit. An additional tap-off line 7 is available to supply power to a second counter, not shown.

The use of the present device is extremely simple. To determine the viscosity of a liquid probably having a viscosity within the range of two to ten centistokes, a viscosimeter is selected which has a meter constant of 0.01, which corresponds to the highest viscosity determinable with the particular viscosimeter. Switch 101 is set at position 2 to correspond with the meter constant. A quantity of liquid is placed in the viscosimeter tube, the level of said liquid adjusted to be above the upper mark, and liquid flow commenced in the usual way. As soon as the level reaches the upper mark, switch 102 is depressed, closing the circuit leading to counter 101. When the liquid level passes the lower mark, switch 102 is released, thereby disconnecting counter MRC101. The kinematic viscosity is then simply read on the counter face; PL103 is lit and this immediately gives the correct decimal place.

Particular values of resistors, capacitors, and vacuum tubes which have been found suitable for use in the present invention are set forth below.

*Resistors*

| | |
|---|---|
| $R_{101}$ | 2.2K |
| $R_{102}$ | 100K |
| $R_{103}$ | 100K |
| $R_{104}$ | 2.2K |
| $R_{105}$ | 100K |
| $R_{106}$ | 270K |
| $R_{107}$ | 100K |
| $R_{108}$ | 47K |
| $R_{109}$ | 470K |
| $R_{110}$ | 100K |
| $R_{111}$ | 6.8K |
| $R_{112}$ | 47K |
| $R_{113}$ | 15K |
| $R_{114}$ | 150K |
| $R_{115}$ | 4.7K |
| $R_{116}$ | 10K |
| $R_{117}$ | 1M |
| $R_{200}$ | 33K |
| $R_{201}$ | 330K |
| $R_{202}$ | 10K |
| $R_{203}$ | 470K |
| $R_{204}$ | 15K |
| $R_{205}$ | 220K |
| $R_{206}$ | 33K |
| $R_{301}$ | 2K |
| $R_{302}$ | 4K |
| $R_{400}$ | 33K |
| $R_{401}$ | 470K |
| $R_{402}$ | 330K |
| $R_{403}$ | 22K |
| $R_{404}$ | 33K |
| $R_{501}$ | 270K |
| $R_{502}$ | 150K |
| $R_{503}$ | 270K |
| $R_{504}$ | 150K |
| $R_{505-9}$, incl. | 1M |
| $R_{510-14}$, incl. | 0.47M |
| $R_{515-19}$, incl. | 100K |
| $R_{520}$ | 20K |
| $R_{521}$ | 100K |
| $R_{522}$ | 100K |
| $R_{601}$ | 47K |
| $R_{602}$ | 3.3M |
| $R_{603}$ | 20K |
| $R_{604}$ | 47K |
| $R_{605}$ | 100K |
| $R_{606}$ | 47K |
| $R_{607}$ | 1M |
| $R_{608}$ | 22M |
| $R_{610}$ | 22M |
| $R_{701}$ | 22Ω |
| $R_{702}$ | 270K |
| $R_{703}$ | 150K |

*Condensers*

| | |
|---|---|
| $C_{101}$ | .25 µfd. |
| $C_{102}$ | .5 µfd. |
| $C_{103}$ | .1 µfd. |
| $C_{104}$ | .5 µfd. |
| $C_{105}$ | .25 µfd. |
| $C_{106}$ | .1 µfd. |
| $C_{107}$ | .5 µfd. |
| $C_{200}$ | 47 µµf. |
| $C_{301}$ | .85 mfd. |
| $C_{302a}$ | .05 mfd. |
| $C_{302b}$ | 20 mfd. |
| $C_{303}$ | .005 mfd. |
| $C_{304}$ | 10 ma. |
| $C_{400}$ | 47 µµf. |
| $C_{401}$ | 10 µµf. |
| $C_{402}$ | 10 µµf. |
| $C_{403}$ | 47 µµf. |
| $C_{404}$ | 0.0047 µf. |
| $C_{501}$ | 68 µµf. |
| $C_{502}$ | 47 µµf. |
| $C_{503}$ | 68 µµf. |
| $C_{504}$ | 47 µµf. |
| $C_{505}$ | 800 µµf. |
| $C_{506}$ | 800 µµf. |
| $C_{507}$ | 800 µµf. |
| $C_{508}$ | 800 µµf. |
| $C_{509}$ | 10 µf. |
| $C_{510}$ | 0.05 µf. |
| $C_{511}$ | 800 µµf. |
| $C_{601}$ | .05 µf. |
| $C_{602}$ | .01 µf. |
| $C_{603}$ | .05 µf. |
| $C_{604}$ | .5 µf. |
| $C_{605}$ | .05 µf. |
| $C_{701}$ | 80 µf. |
| $C_{702}$ | 80 µf. |
| $C_{703}$ | 68 µµf. |
| $C_{704}$ | 47 µµf. |

*Vacuum tubes*

| | | | |
|---|---|---|---|
| $V_1$ | 12AU7 | $V_4$ | 6AN8 |
| $V_2$ | 12AU7 | $V_5$ | 12AU7 |
| $V_3$ | 12AU7 | $V_6$ | 12BH7 |

From the foregoing discussion and specific embodiment it is manifest that all of the objects of the present invention have been attained in the timer-computer herein described. By generating accurately timed electrical pulses, producing a plurality of frequencies from the pulses, selecting one of said frequencies, and counting the number of pulses received during a time interval, it is thus possible to obtain an exceedingly accurate visible indication of either elapsed time or a result which is the product of elapsed time by one of several constants. The device of the present invention not only provides an apparatus which is simple to use, but entirely eliminates computational and measurement errors which were prevalent with prior art instruments.

Thus having described the invention, what is claimed is:

A viscosimeter-computer apparatus suitable for use with remotely located viscosimeters comprising: a plurality of viscosimeter stations, each station including a plurality of viscosimeters each having a different viscosimeter constant relating a measuring period to fluid viscosity; a central frequency source unit including a single tuning fork oscillator providing accurately timed pulses; a plurality of electronic binary frequency dividers in said source unit adapted to produce a plurality of frequencies from said oscillator corresponding to said viscosimeter constants; a plurality of remotely located counting units, each unit disposed at one of said viscosimeter stations and communicating with said frequency source unit; means in each of said counting units for selecting one of said plurality of frequencies corresponding to a selected viscosimeter; means in each counting unit for counting the number of pulses received during a measuring period and for visibly indicating the number of such counts in units of fluid viscosity; and manual switch means in each of said counting units for engaging the counting and visibly indicating means with the selected frequency during the viscosimeter measuring period.

References Cited in the file of this patent

UNITED STATES PATENTS

| | | |
|---|---|---|
| 2,809,292 | Shaw | Oct. 8, 1957 |
| 2,828,468 | Ball et al. | Mar. 25, 1958 |
| 2,835,868 | Lindesmith | May 20, 1958 |
| 2,844,790 | Thompson et al. | July 22, 1958 |
| 2,851,596 | Hilton | Sept. 9, 1958 |
| 2,872,670 | Dickinson | Feb. 3, 1959 |